United States Patent
Ogrinc et al.

(10) Patent No.: US 9,508,111 B1
(45) Date of Patent: *Nov. 29, 2016

(54) METHOD AND SYSTEM FOR DETECTING A DISPLAY MODE SUITABLE FOR A REDUCED REFRESH RATE

(75) Inventors: Michael A. Ogrinc, San Francisco, CA (US); Brett T. Hannigan, Philadelphia, PA (US); David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2073 days.

This patent is subject to a terminal disclaimer.

(21) Appl. No.: 11/957,379

(22) Filed: Dec. 14, 2007

(51) Int. Cl.
| G06T 1/00 | (2006.01) |
| G06F 15/00 | (2006.01) |
| G06T 1/20 | (2006.01) |
| G09G 5/36 | (2006.01) |

(52) U.S. Cl.
CPC ............. *G06T 1/20* (2013.01); *G09G 5/363* (2013.01)

(58) Field of Classification Search
None
See application file for complete search history.

(56) References Cited

U.S. PATENT DOCUMENTS

| 6,222,881 | B1 | 4/2001 | Walker |
| 6,642,928 | B1 | 11/2003 | Deming et al. |
| 7,405,738 | B2 | 7/2008 | Mance et al. |
| 7,692,642 | B2 | 4/2010 | Wyatt |
| 2002/0015104 | A1 | 2/2002 | Itoh et al. |
| 2002/0027541 | A1* | 3/2002 | Cairns et al. ............ 345/87 |
| 2004/0239677 | A1* | 12/2004 | Mutanen et al. ......... 345/545 |
| 2004/0252115 | A1 | 12/2004 | Boireau |
| 2005/0114894 | A1* | 5/2005 | Hoerl ........................ 725/74 |
| 2006/0056508 | A1* | 3/2006 | Lafon et al. ........... 375/240.03 |
| 2006/0146056 | A1 | 7/2006 | Wyatt |
| 2006/0291558 | A1 | 12/2006 | Schreier et al. |
| 2007/0047660 | A1 | 3/2007 | Mitani et al. |
| 2007/0071404 | A1 | 3/2007 | Curtner et al. |
| 2007/0103387 | A1 | 5/2007 | Kondo et al. |
| 2007/0103585 | A1 | 5/2007 | Takeuchi et al. |
| 2007/0273787 | A1 | 11/2007 | Ogino et al. |
| 2008/0055318 | A1 | 3/2008 | Glen |
| 2008/0100598 | A1 | 5/2008 | Juenger |
| 2008/0152014 | A1 | 6/2008 | Schreier et al. |
| 2008/0239143 | A1 | 10/2008 | Shin et al. |
| 2009/0087016 | A1 | 4/2009 | Berestov et al. |

OTHER PUBLICATIONS

Office Action, U.S. Appl. No. 11/957,374 dated May 11, 2011.
Office Action, U.S. Appl. No. 11/957,374 dated Nov. 23, 2010.
Office Action, U.S. Appl. No. 11/957,375 dated Feb. 8, 2011.

* cited by examiner

*Primary Examiner* — Tize Ma
(74) *Attorney, Agent, or Firm* — Artegis Law Group, LLP

(57) ABSTRACT

A method and system for detecting a display mode suitable for a reduced display refresh rate are disclosed. Specifically, one embodiment of the present invention sets forth a computing device, which includes a memory and a processing unit. The memory stores multiple image surface data. The processing unit is configured to compose a first display frame from a first base surface and optionally a first overlay surface, calculate a first numerical code representative of a first frame content of the first display frame, compose a second display frame from a second base surface and optionally a second overlay surface, calculate a second numerical code representative of a second frame content of the second display frame, and track the results of comparing the first numerical code with the second numerical code to determine whether a change between the first frame content and the second frame content has occurred.

6 Claims, 7 Drawing Sheets

METHOD AND SYSTEM FOR DETECTING A DISPLAY MODE SUITABLE FOR A REDUCED REFRESH RATE

BACKGROUND OF THE INVENTION

Field of the Invention

The present invention generally relates to display systems capable of dynamically controlling a display refresh rate, and more particularly to a method and system for detecting display modes suitable for reduced refresh rates.

Description of the Related Art

Unless otherwise indicated herein, the approaches described in this section are not prior art to the claims in this application and are not admitted to be prior art by inclusion in this section.

The refresh rate of a display device is the frequency at which display frames are repainted on a display device. Each refresh cycle of the display screen usually involves a series of processing steps, including accessing image data of multiple image surfaces rendered and stored in a frame buffer and combining the image surfaces to form a composite display frame. In parallel, the video signals corresponding to the composite display frame are also driven to the display device to update each pixel onto the screen of the display device. "Tearing" and other visual artifacts can occur when the asynchronous steps of rendering/compositing a frame and scanning out pixels occur out of sync. To avoid these artifacts, visual computing devices typically do "flipping" wherein composition of new frame buffer contents is done in off-screen frame-buffer memory separate from the frame-buffer currently being scanned from, and then synchronize the scanning to begin on the new frame-buffer as the scan-out of the current frame-buffer has reached it's end. As these processing steps are repeated at a high frequency, they can consume significant amount of power.

For situations in which dynamic graphics contents are to be rendered on the screen, e.g., interactive 3D games where the frame buffer contents are switched at a high frequency, also referred to as a "high flipping rate", a refresh rate of at least 60 Hz is usually necessary to completely convey the changing pixels without missing any visual content on the display screen. However, in other instances where the frame buffer updates are occurring at a low flipping rate, e.g., such as when the display screen represents an idle or quasi-static Windows Desktop image without any inputs or cursor movements by the user, it may be visually acceptable to reduce the refresh rate of the display screen to reduce the power consumption.

U.S. Application Publication No. 2006/0146056 describes one technical approach for dynamically controlling the refresh rate of a display device. This technical approach, also described as a "temporal entropy approach using intra-frame entropy detection", detects significant rendering in a display frame by assessing a bounded area affected by the content updates. However, this approach involves a number of testing steps in software and hardware to detect the bounded area which does not exclude interference of small display surfaces such as cursors. To carry out these steps in a timely manner, additional hardware complexity is required and thus driving up the cost of implementing and validating this technical approach.

What is needed in the art is thus a method and system that can cost effectively and efficiently detect a display mode suitable for a reduced display refresh rate and address at least the problems set forth above.

SUMMARY OF THE INVENTION

A method and system for detecting a display mode suitable for a reduced display refresh rate are disclosed. Specifically, one embodiment of the present invention sets forth a computing device, which includes a memory and a processing unit. The memory stores multiple image surface data. The processing unit is configured to compose a first display frame from a first base surface and optionally a first overlay surface, calculate a first numerical code representative of a first frame content of the first display frame, compose a second display frame from a second base surface and optionally a second overlay surface, calculate a second numerical code representative of a second frame content of the second display frame, and track the results of comparing the first numerical code with the second numerical code to determine whether a change between the first frame content and the second frame content has occurred.

At least one advantage of the present invention disclosed herein is the ability to determine the display mode and dynamically reduce the refresh rate in a cost effective matter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, the term "display frame" means an image frame that includes one or more image surfaces to be presented on the screen of a display device. Illustrative image surfaces include, without limitation, (i) a base surface, such as a computer desktop background, (ii) an overlay surface, such as a window representing an application program process overlaying the desktop background, and (iii) a cursor surface, such as a blinking carat indicative of a position on the screen. Further, the term "frame content" refers to graphics data, such as pixel colors or transparency values, for the image represented in a composed display frame. In addition, the term "display device" may be any types of display monitors such as liquid crystal displays, cathode-ray-tube displays, plasma displays, or any other suitable display systems. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 1A:
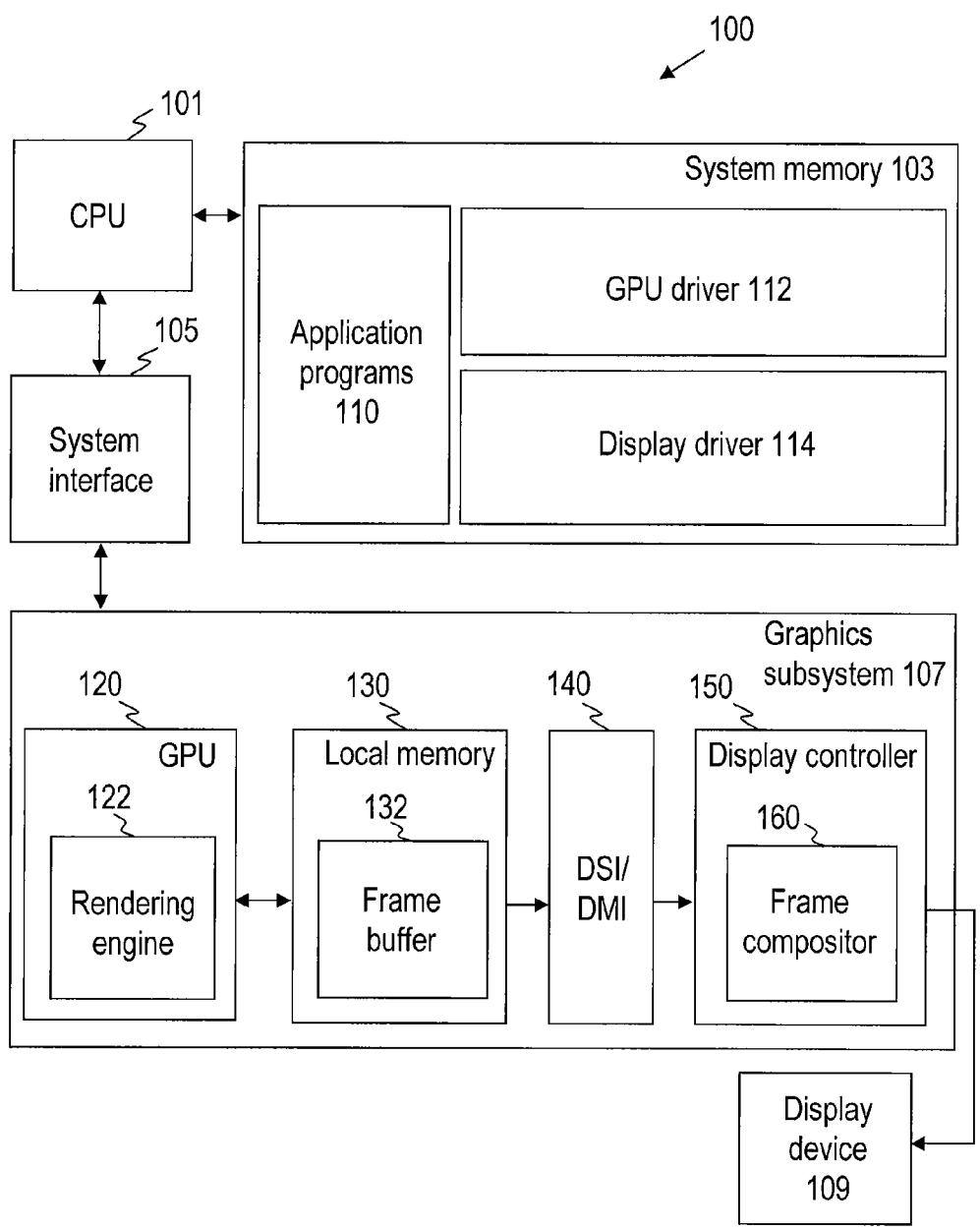
FIG. 1A is a conceptual diagram of a computer system configured to implement one or more aspects of the present invention.

FIG. 1A is a conceptual diagram of a computer system 100 configured to implement one or more aspects of the present invention. Computer system 100 includes a central processing unit (CPU) 101, a system memory 103, a system interface 105, a graphics subsystem 107, and a display device 109. The CPU 101 connects to system memory 103 and system interface 105. The CPU 101 executes programming instructions stored in system memory 103, operates on data stored in system memory 103, and communicates with graphics subsystem 107 through the system interface 105. In alternate embodiments, CPU 101, graphics subsystem 107, system interface 105, or any combination thereof, may be integrated into a single processing unit. Further, the functionality of the graphics subsystem 107 may be included in a chipset or in some other type of special purpose processing unit or co-processor. System memory 103 typically includes dynamic random access memory (DRAM) configured to either connect directly to CPU 101 (as shown) or alternately, via system interface 105. Graphics subsystem 107 receives instructions transmitted by CPU 101 and processes the instructions in order to render graphics data and images for display on display device 109. Display device 109 is an output device capable of emitting a visual image corresponding to an input data signal.

Graphics subsystem 107 includes a graphics processing unit (GPU) 120, a local memory 130, a display software/monitor interface (DSI/DMI) 140, and a display controller 150. The GPU 120 receives instructions transmitted by CPU 101 and processes the instructions in order to render graphics data into images stored in local memory 130. In particular, a rendering engine 122 inside the GPU 120 generates and stores multiple image surfaces in a frame buffer 132 within local memory 130. DSI/DMI 140 is a link interface through which display controller 150 communicates with frame buffer 132 and device drivers. Display controller 150 accesses frame buffer 132 through the DSI/DMI 140 at a specified rate to retrieve and merge the various image surfaces to present to the display device 109 for display. A frame compositor 160 within the display controller 150 is responsible for merging the image surfaces, which will be discussed in further details hereinafter.

System memory 103 may include multiple application programs 110, a GPU driver 112, and a display driver 114. Application programs 212 may invoke one or more instances of high-level shader programs that are designed to operate on the rendering engine 122 within GPU 120. These high-level shader programs may be translated into executable program objects by a compiler or assembler included in GPU driver 112 or alternatively by an offline compiler or assembler operating either on computer system 100 or other computer systems. Display driver 114 causes the display controller 160 to access multiple image surfaces from the frame buffer 132 and compose display frames for presentation on the display device 109. In order to control the refresh rate of the display device 109, in one implementation, the display driver 114 also determines a display mode for the display device 109 based on certain information tracked by the frame compositor 160, such as the rate of change in content over a period of time.

Figure 1B:
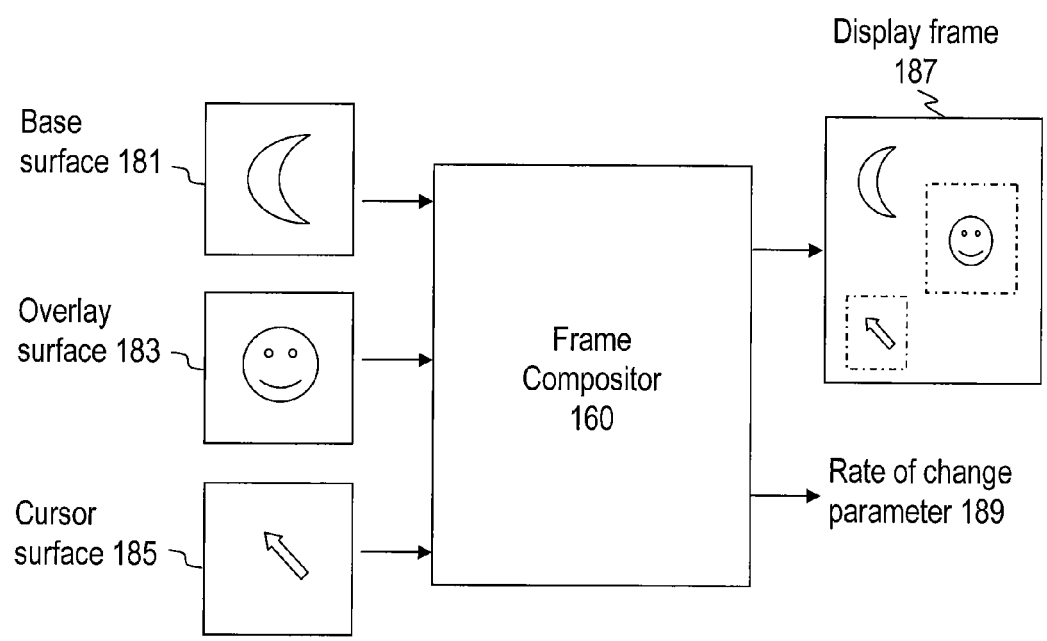
FIG. 1B is a block diagram of a frame compositor operable to measure a rate of frame content changes according to one or more aspects of the present invention.
Figure 1C:
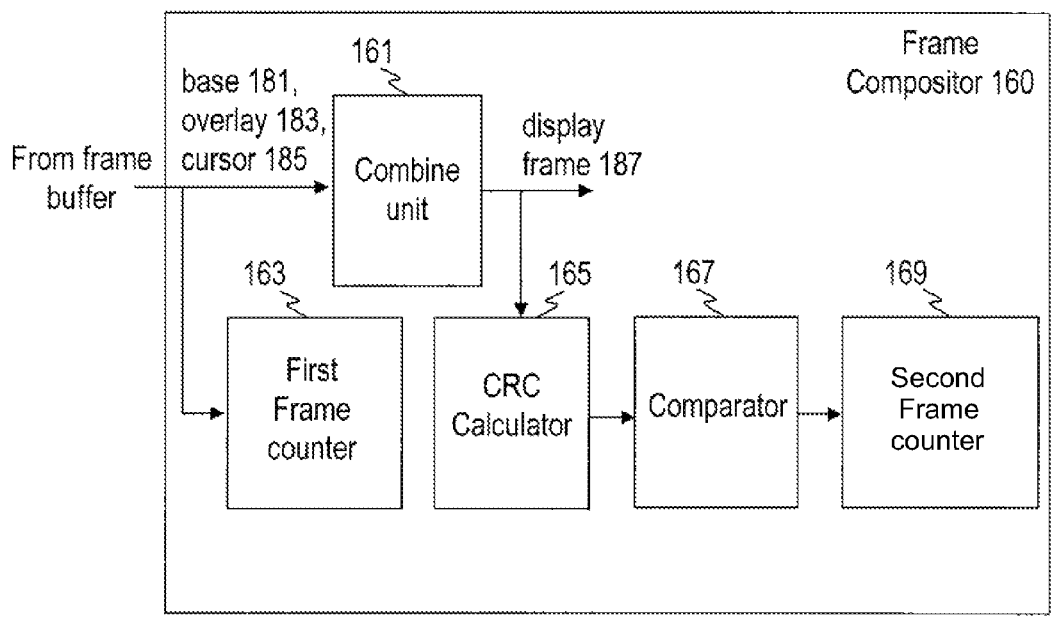
FIG. 1C is a conceptual diagram of a frame compositor according to one embodiment of the invention.
Figure 2A:
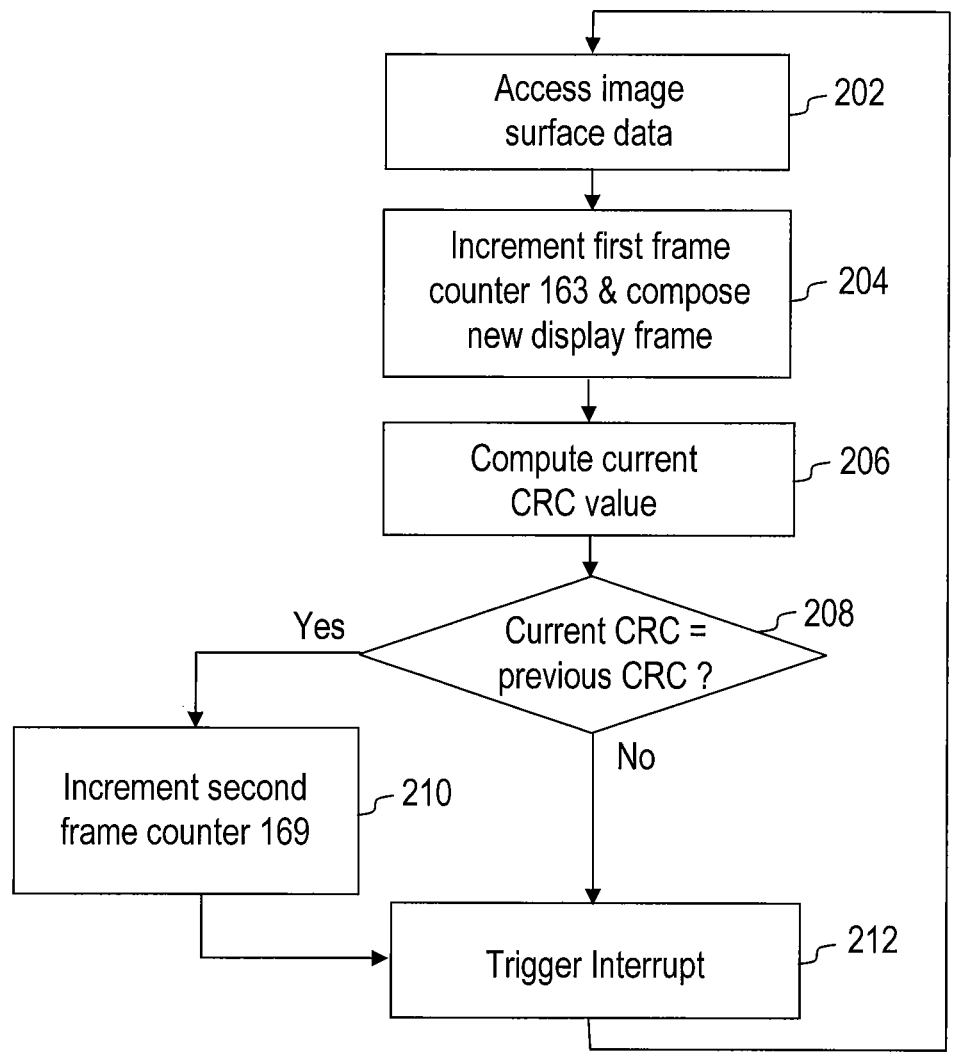
FIG. 2A is a flowchart showing the method steps for measuring a rate of frame content changes through a frame compositor, according to one embodiment of the present invention.
Figure 2B:
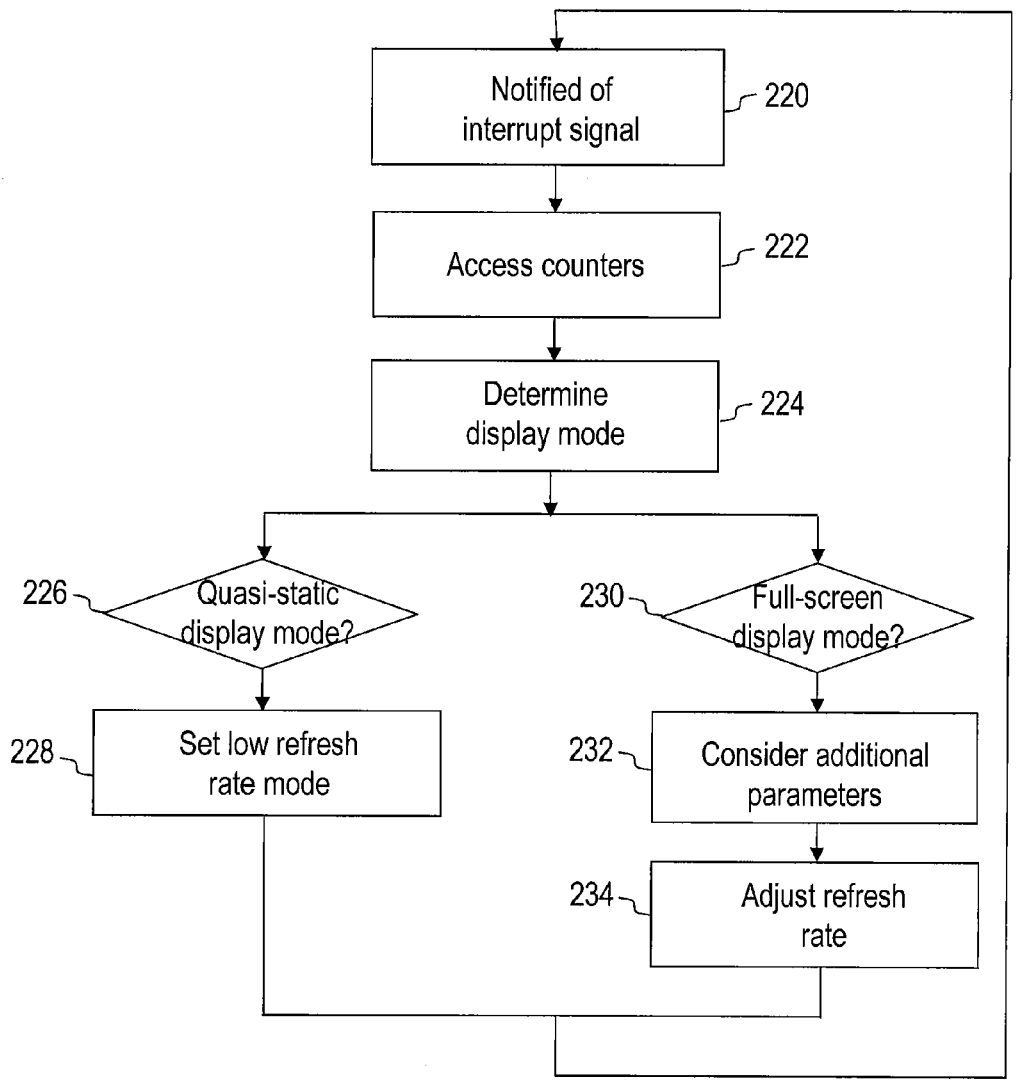
FIG. 2B is a flowchart showing the method steps implemented by a display driver interfacing with a display controller to dynamically control a display refresh rate, according to one embodiment of the present invention.

FIG. 1B and FIG. 1C are simplified block diagrams illustrating how the frame compositor 160 is configured to measure a rate of change in content, according to one embodiment of the present invention. Referring to FIGS. 1B and 1n conjunction with FIG. 1A, at each refresh cycle, the frame compositor 160 receives multiple image surface data stored in frame buffer 132. In the illustrated embodiment, the multiple image surface data include a base surface 181, an overlay surface 183 and cursor surface 185. The frame compositor 160 is configured to combine the image surfaces into a display frame 187 for presentation on the display device 109. For each newly generated display frame 187, the frame compositor 160 also determines whether any content in the display frame 187 has changed from the previous frame, tracks the rate of change, and updates a rate of change parameter 189.

FIG. 1C illustrates one implementation of the frame compositor 160 suitable for tracking the rate of change parameter 189, according to one embodiment of the invention. The frame compositor 160 includes a combine unit 161, a cyclic redundancy check ("CRC") calculator 165, a comparator 167, a first frame counter 163, and a second frame 169 tracking a number of frames with the same or similar content. Specifically, the first frame counter 163 increments as the combine unit 161 receives and merges multiple image surface data to generate the display frame 187. The display frame 187 is then put through the CRC calculator 165, which applies a CRC algorithm to compute a current CRC value associated with the content of the display frame 187. It is worth noting that although the CRC method is discussed herein, a person with ordinary skills in the art will recognize that other methods for generating a numerical code representative of the content of the display frame 187 can be used. The comparator 167 compares the current CRC value associated with the currently generated display frame 187 against a previous CRC value associated with a previously generated display frame 187. If the current CRC value is equal to the previous CRC value, then the content of the newly generated display frame 187 is identical to the content of the previously generated display frame 187, and the comparator 167 signals the frame counter 169 to increment. Otherwise, the frame counter 169 remains unchanged.

In conjunction with FIGS. 1A through 1C, FIG. 2A is a flowchart showing the method steps of measuring a rate of change in content over a period of time by the frame compositor 160, according to one embodiment of the present invention. In the initial step 202, the combine unit 161 within frame compositor 160 accesses one or more image surface data from the frame buffer 132. In step 204, the combine unit 161 then merges the multiple image surfaces into a new display frame 187, and causes the frame counter 163 to be incremented by one. In step 206, based on the new display frame 187, the CRC calculator 165 computes a current CRC value associated with the content of this new display frame 187. In step 208, the comparator 167 then compares the current CRC value against a previous CRC value associated with a previously composed display frame to determine whether there is a change in the frame content. If the current CRC value is equal to the previous CRC value, the comparator 167 in step 210 causes the second frame counter 169 to be incremented. On the other hand, if the current CRC value differs from the previous CRC value, the second frame counter 169 is kept unchanged. In step 212, after the first frame counter 163 and the second frame counter 169 have been updated, the DSI/DMI 140 issues an Interrupt signal indicating the frame counters are ready for access. The frame compositor 160 can then restart the aforementioned processing cycle for the next display frame 187.

In the illustrated embodiment, the Interrupt signal is issued for every composed display frame. However, in other embodiments, the Interrupt signal may be issued at intervals of more than one composed display frames. Based on the content of the counters 163 and 169, the rate of frame content changes 189 can be derived by tracking how many frames in which the content remains the same or relatively unchanged. In an alternative embodiment, a person skilled in the art will readily appreciate that the rate of change parameter 189 can be derived by using the second frame counter 169 to track the occurrences of when the new CRC value differs from the previous CRC value.

Again in conjunction with FIGS. 1A through 1C, FIG. 2B is a flowchart showing the method steps for dynamically controlling the refresh rate of the display device 109, according to one embodiment of the present invention. In the initial step 220, the display driver 114 is notified of an Interrupt signal issued by the DSI/DMI 140. As described above, the Interrupt signal indicates that the first and the second frame counters 163 and 169 have been updated. In step 222, the display driver 114 accesses the first and the second frame counters 163 and 169 through the DSI/DMI 140 and calculates the rate of change in the following manner: total number of frames in which the content remains the same/ total number of frames monitored within a time period. In step 224, based on the calculated rate of change, the display driver 114 determines an appropriate display mode for the display device 109. For example, in step 226, if a low rate of change, such as 2 Hz, is detected and indicative of slight content changes (e.g., a blinking cursor), then this corresponds to a quasi-static display mode. In step 228, the display driver 114 then sets the display controller 150 with a low refresh rate mode corresponding to this quasi-static display mode.

Another display mode that may also be detected by display driver 114 in step 230 is a full-screen display mode, in which an application window occupies the full screen of the display device 109. In the full-screen display mode, display driver 114 is able to gain access to additional information from other drivers, such as GPU driver 112, associated with the application process that is being displayed on the full screen. In particular, in step 232, the display driver 114 may consider additional parameters, such as a flipping rate of the frame buffer 132, which indicates the frequency at which image surfaces are rendered and updated in the frame buffer 132. If there is any discrepancy between the flipping rate and the detected rate of change as discussed above, then a decision regarding whether an adjustment to the refresh rate is needed can be made. In step 234, the display driver 114 can adjust the refresh rate to be at least higher than the flipping rate to minimize the undesirable flickering effect. After the refresh rate is adjusted for the detected display mode, the display driver 114 waits for a next interrupt signal to determine whether the refresh rate mode needs to be modified. The first and second frame counters 163 and 169 may reset after the refresh rate is adjusted or alternatively roll over after reaching certain counts.

As has been described above, the refresh rate of the display device 109 can be dynamically adjusted based on the rate of change in frame content. In certain instances, however, the detected change in frame content may only result from simple cursor movements while the content of other image surfaces remain unchanged. For these display situations, even though there are only slight content changes from one display frame to another, the calculated CRC values may differ significantly. Thus, it is desirable to have a frame compositor that is also capable of measuring a more pertinent rate of change that excludes cursor movements. This can be achieved by computing a CRC value for a display frame without the cursor surface data.

Figure 3:
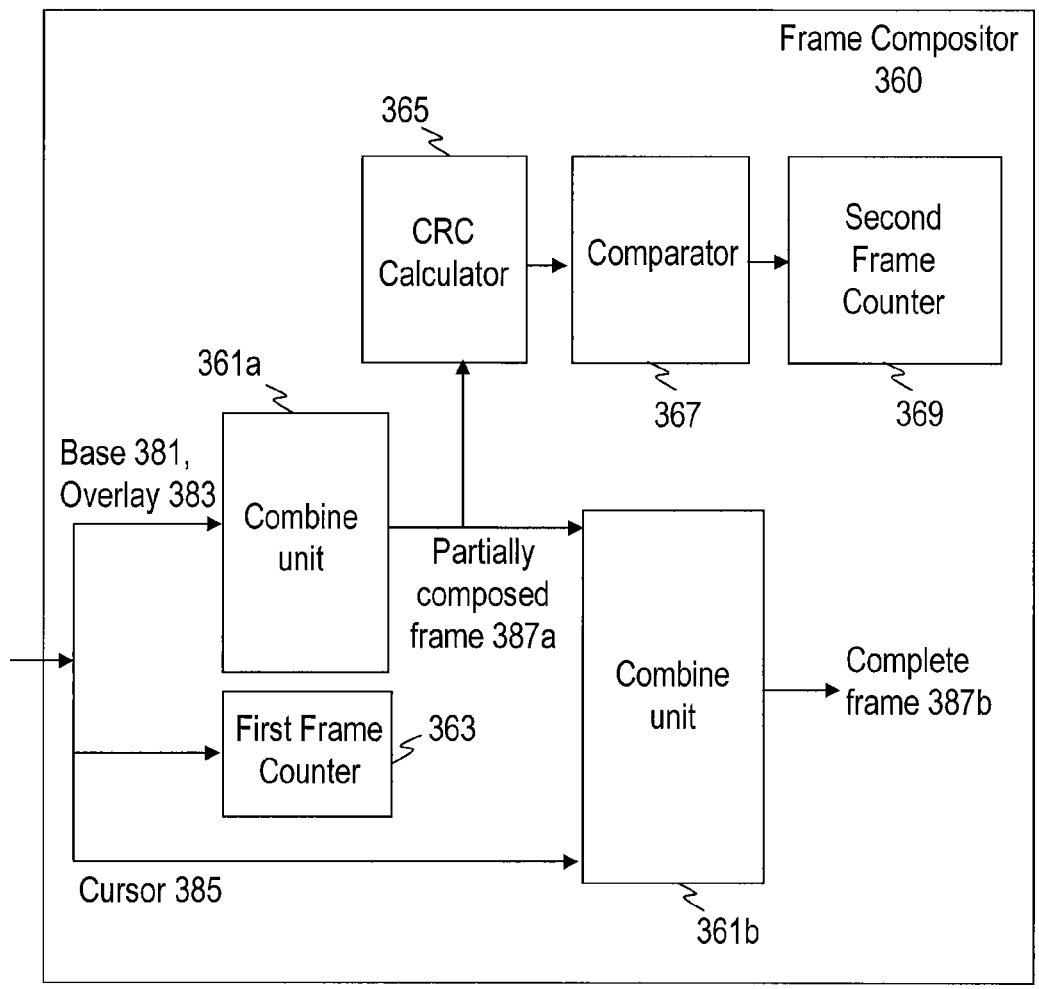
FIG. 3 is a conceptual diagram of a frame compositor configured to measure a rate of frame content changes according to another embodiment of the present invention.
Figure 4:
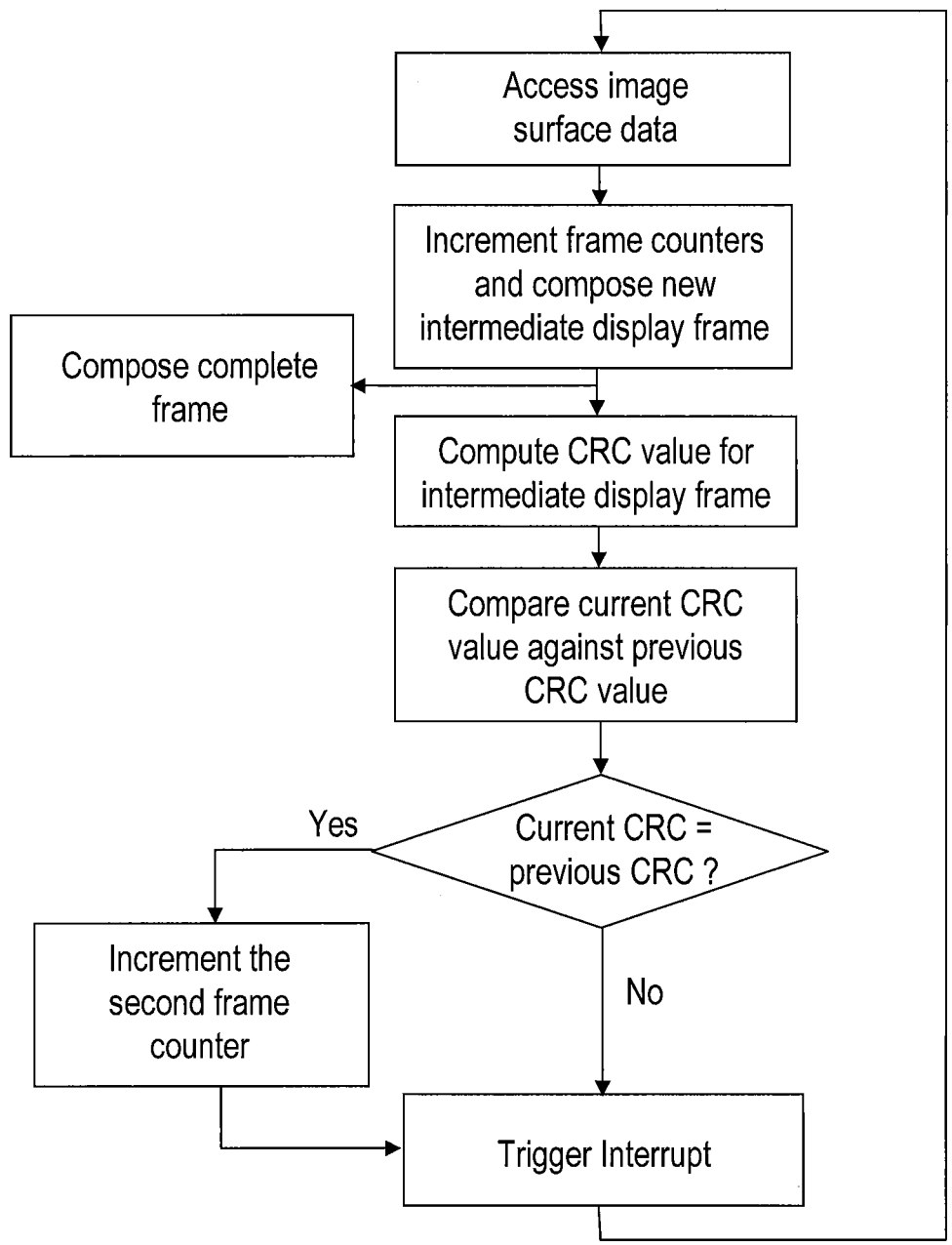
FIG. 4 is a flow diagram illustrating the method steps for dynamically adjusting the refresh rate by using partially composed display frames, according to one embodiment of the present invention.

FIG. 3 illustrates an alternative embodiment of the frame compositor 160 shown in FIG. 1B that is configured to track a rate of change for display frames without the cursor surface data. Specifically, in one implementation, a frame compositor 360 includes two combine units 361a and 361b, a first frame counter 363, a CRC calculator 365, a comparator 367 and a second frame counter 369. The frame compositor 360 causes the first frame counter 363 to be incremented as it receives multiple image surface data, such as a base surface 381, an overlay surface 383, and a cursor surface 385. The first combine unit 361a composes a partial display frame 387a with the base surface 381 and overlay surface 383. The second combine unit 361b composes a complete display frame 387b from the partially composed display frame 387a and the remaining image surface, such as the cursor surface 385. In this embodiment, the CRC calculator 365 is arranged to compute a current CRC value associated with the partially composed frame 387a. The comparator 367 compares the current CRC value against a previous CRC value associated with a previous partially composed display frame generated by the first combine unit 361a. If the current CRC value is equal to the previous CRC value, the content of the new partially composed display frame is deemed to be identical to the content of the previous partially composed display frame, and the comparator 367 signals the second frame counter 369 to increment. In order to track the rate of change using the first frame counter 363 and the second frame counter 369 for partial display frame 387a, the method steps employed by the frame compositor 360 can be similar to those described in conjunction with FIG. 2A for measuring the rate of change with respect to the complete display frame 187. In particular, FIG. 4 illustrates the method steps for dynamically adjusting the refresh rate by using partially composed display frames, according to one embodiment of the present invention. Unlike the method steps shown in FIG. 2A, the CRC values are computed based on the content of intermediate display frames, also referred to as the partially composed display frames.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A computer-implemented method for determining a display mode for a display device based on a rate of change of content across display frames, the method comprising:
   receiving a plurality of image surfaces from a frame buffer memory, wherein the plurality of image surfaces includes a base surface and an overlay surface;
   incrementing a first counter that resides within a frame compositor in response to receiving the plurality of image surfaces;
   composing, via a combine unit that resides within the frame compositor, a current display frame based on the base surface and the overlay surface;
   calculating, via a cyclic redundancy check (CRC) calculator that resides within the frame compositor, a first numerical code associated with content of the current display frame;
   comparing, via a comparator unit that resides within the frame compositor, a second numerical code associated with the content of a previous display frame to determine whether the current display frame is identical to the previous display frame; and
   if the current display is identical to the previous display, then incrementing a second counter that resides within the frame compositor; or
   if the current display is not identical to the previous display, then not incrementing the second counter,
   wherein a rate of change of display frame content is calculated by dividing the count of the second counter by the count of the first counter;
   wherein the plurality of image surfaces does not include a cursor surface, and the current display frame comprises an intermediate display frame.

2. The method of claim 1, further comprising composing, via a second combine unit that resides within the frame compositor, a final display frame based on the current display frame and a cursor surface received from the frame buffer memory.

3. A display controller configured for determining a display mode for a display device based on a rate of change of content across display frames, the display controller comprising:
   a frame compositor that includes a first combine unit configured to receive a plurality of image surfaces from a frame buffer memory, wherein the plurality of image surfaces includes a base surface and an overlay surface, and compose a current display frame based on the base surface and the overlay surface;
   a first counter this is configured to be incremented in response to receiving the plurality of image surfaces;
   a cyclic redundancy check (CRC) calculator configured to calculate a first numerical code associated with content of the current display frame;
   a comparator unit configured to compare a second numerical code associated with the content of a previous display frame to determine whether the current display frame is identical to the previous display frame; and
   a second counter configured to be incremented, if the current display is identical to the previous display, or not incremented if the current display is not identical to the previous display,
   wherein a rate of change of display frame content is calculated by dividing the count of the second counter by the count of the first counter;
   wherein the plurality of image surfaces does not include a cursor surface, and the current display frame comprises an intermediate display frame.

4. The display controller of claim 3, further comprising a second combine unit configured to compose a final display frame based on the current display frame and a cursor surface received from the frame buffer memory.

5. A graphics subsystem, comprising:
   a processing unit;
   a local memory coupled to the processing unit; and
   a display controller having a frame compositor and configured for determining a display mode for a display device based on a rate of change of content across display frames, wherein the frame compositor includes:
   a first combine unit configured to receive a plurality of image surfaces from the local memory, wherein the plurality of image surfaces includes a base surface and an overlay surface, and compose a current display frame based on the base surface and the overlay surface;
   a first counter configured to be incremented in response to receiving the plurality of image surfaces;
   a cyclic redundancy check (CRC) calculator configured to calculate a first numerical code associated with content of the current display frame;
   a comparator unit configured to compare a second numerical code associated with the content of a previous display frame to determine whether the current display frame is identical to the previous display frame; and
   a second counter configured to be incremented, if the current display is identical to the previous display, or not incremented if the current display is not identical to the previous display,
   wherein a rate of change of display frame content is calculated by dividing the count of the second counter by the count of the first counter;
   wherein the plurality of image surfaces does not include a cursor surface, and the current display frame comprises an intermediate display frame.

6. The graphics subsystem of claim 5, wherein the frame compositor further includes a second combine unit configured to compose a final display frame based on the current display frame and a cursor surface received from the frame buffer memory.

* * * * *